Mar. 3, 1925.

T. M. HUNTER ET AL 1,528,333

HEATING FURNACE

Filed Jan. 18, 1922     7 Sheets-Sheet 1

INVENTORS
THOMAS M. HUNTER &
CLAUDE J. HOLSLAG.
BY
A. D. T. Libby
ATTORNEY

Mar. 3, 1925. 1,528,333

T. M. HUNTER ET AL
HEATING FURNACE
Filed Jan. 18, 1922   7 Sheets-Sheet 2

INVENTORS
THOMAS M. HUNTER
&
BY CLAUDE J. HOLSLAG
A. D. T. Libby
ATTORNEY

T. M. HUNTER ET AL

HEATING FURNACE

Filed Jan. 18, 1922  7 Sheets-Sheet 4

INVENTORS
THOMAS M. HUNTER &
CLAUDE J. HOLSLAG
BY
*A. D. T. Libby*
ATTORNEY

Mar. 3, 1925. 1,528,333
T. M. HUNTER ET AL
HEATING FURNACE
Filed Jan. 18, 1922 7 Sheets-Sheet 5

INVENTORS
THOMAS M. HUNTER &
CLAUDE J. HOLSLAG
BY
A. D. T. Libby
ATTORNEY

Mar. 3, 1925. 1,528,333
T. M. HUNTER ET AL
HEATING FURNACE
Filed Jan. 18, 1922 7 Sheets-Sheet 7

INVENTORS
THOMAS M. HUNTER &
CLAUDE J. HOLSLAG
BY
A. D. T. Libby
ATTORNEY

Patented Mar. 3, 1925.

1,528,333

UNITED STATES PATENT OFFICE.

THOMAS M. HUNTER, OF NEWARK, AND CLAUDE J. HOLSLAG, OF SOUTH ORANGE, NEW JERSEY.

HEATING FURNACE.

Application filed January 18, 1922. Serial No. 530,085.

*To all whom it may concern:*

Be it known that we, THOMAS M. HUNTER and CLAUDE J. HOLSLAG, citizens of the United States, residing at Newark, in the county of Essex and State of New Jersey, and at South Orange, in the said county and State, respectively, have invented certain new and useful Improvements in Heating Furnaces, of which the following is a specification.

This invention relates to a heating furnace, particularly adapted for heating rivets and the like, although it is to be thoroughly understood that our invention is in no way limited to this particular use, even though it is illustrated and described for this special purpose. Furthermore, while we have chosen to illustrate certain forms of our invention utilizing an electric current either through electrodes forming an arc or through a suitable resistor, we wish it to be understood that gas or liquid fuel may be used in place of either or both of the aforesaid means, as in certain localities, liquid fuel or gas may be cheaper than electric current.

In electric rivet heaters with which we are familiar, the rivet is usually placed between a pair of electrodes serving as jaws for clamping the rivet and then passing current through the rivet, thereby heating the same. In order to get production with a rivet heater of this kind, a multiplicity of electrodes or jaws with their attendant current serving means must be used, which adds weight and cost to the apparatus. Furthermore these types of rivet heaters are open to other objections, one of which is that they will not function properly when rusty rivets are used and it is to be remembered that rivets around a shipyard or railroad shop or other places of this kind are usually more or less rusty. Again the rivets, during a change in demand for the same, may become overheated or the demand may be greater than the capacity of the machine at hand, and the riveters will be obliged to wait on the heater to supply the rivets. Also rivet heaters of this kind are usually not adapted to take different sizes of rivets without making some change in the rivet itself, or readjustment of the jaws or change in the clamping jaws of the heater.

It is the principal object of our invention to provide a furnace which overcomes these and other objections, by providing one in which a relatively large quantity of rivets or rivets of different sizes may be heated at once, then, after they are heated, to automatically move them from the heating position to another part of the furnace where they may be withdrawn at will. While in certain cases it is not absolutely necessary to provide an extra amount of heat at the point of the furnace from which the rivets are withdrawn, yet we prefer to supply what might be termed an auxiliary source of heat in order to maintain the rivets or other articles at the proper forging temperature.

Other and further objects will be apparent after a study of this specification and drawings annexed thereto.

The drawings illustrating our invention are to be understood as being more or less diagrammatic in order to simplify them and still retain sufficient of the structure to illustrate broadly how our invention may be utilized. In the drawings:

Figure 9 is a circuit diagram of the furnace shown in Figs. 4 to 7, inc. while

Figure 16 is a view on the line 16—16 of Fig. 14; while

Figure 21 is an end view of a modified form of our invention; while

Figure 23 is a top view of Figure 21; while

Figure 2:
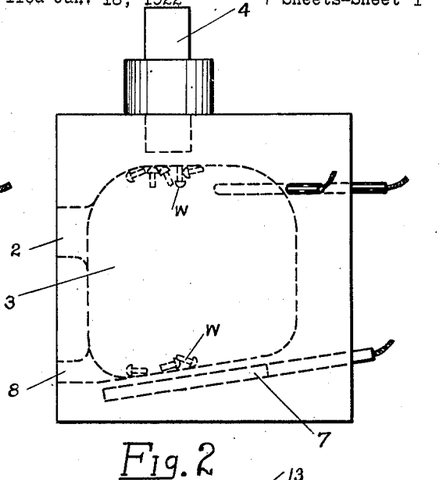
Figure 2 is a side view of Figure 1.
Figure 3:
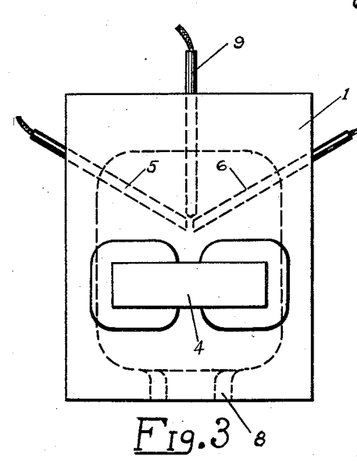
Figure 3 is a plan view of Figure 1, but using a third electrode.

Referring now to the details, wherein like numbers refer to corresponding parts in so far as possible, 1 illustrates the body portion of a furnace which may be constructed of suitable fire brick and cement with any suitable frame to hold the fire brick and cement in position. The front of body 1 has an opening 2 extending into the interior chamber 3. This opening 2 is for the purpose of inserting rivets or other articles therethrough into the chamber 3. Carried on the top of the furnace 1 is an electromagnet 4, the function of which will be directly explained. Passing through the sides of the furnace are arc electrodes 5 and 6, while in the bottom of the furnace is a heating unit 7, an opening 8 is provided adjacent the bottom of the furnace for the purpose of withdrawing the rivets or other articles to be heated. It is to be understood that suitable coverings are used over the openings 2 and 8, but for the purpose of simplicity they are not shown in Figs. 1 and 2. The heating unit 7 may or may not be used. In Fig. 3, in addition to the electrodes 5 and 6, a third electrode 9 is used where a three-wire system is utilized. The electrode 9 may also be a dead electrode, the arc jumping from 5 to 9, then to 6, thus making two arcs in series, which raises the power voltage and decreases the reactance voltage, thereby raising the power factor. The operation of the furnace will best be understood by a description of Fig. 8 wherein it is seen that the resistor 7 which may be of any suitable character is connected to one of the arc electrodes 6. The resistor 7 acts as a stabilizer to the arc. After passing through the arc and the electrode 5, current passes through a series winding 10 of the electromagnet 4 and then through the winding of a relay 11; a second or shunt winding 12 forms part of the electromagnet 4; the circuit, when the arc is in operation, being broken at the contacts 13 of relay 11. When the arc is in operation across the electrodes 5 and 6 the winding 10 is energized, drawing the rivets or work W up against the top portion of the chamber 3 of the furnace, as these rivets are shoveled or passed through the opening 2. After the arc heats up the chamber 3 and the work W, a point, probably close to the recalescent point of the work, is reached, whereby the rivets or work lose their magnetism and drop automatically to the bottom of the furnace on top or in close proximity to the top of the stabilizing resistor 7, which it is seen performs the double function of serving to stabilize the arc as well as to act as a heater for maintaining the rivets at their proper forging temperature. By this arrangement it is seen that rivets of any length or diameter may be used promiscuously for as soon as they are heated they are automatically dropped to the bottom of the furnace, where they can be used at will.

Figure 8:
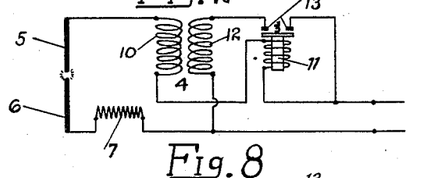
Figure 8 is a circuit diagram of the furnace shown in Fig. 1.

Should, for any reason, the arc go out, the relay 11 instantly responds, closing a circuit by way of the contacts 13 through the shunt holding coil 12, which still maintains the electromagnet 4 energized, thereby holding the work in position to be heated by the arc, after it has been reestablished.

Figure 4:
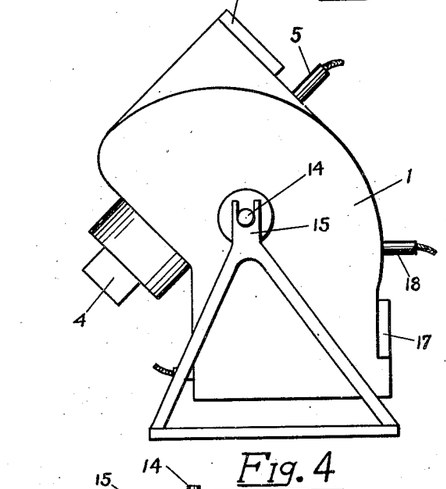
Figure 4 illustrates another form of our invention.
Figure 5:
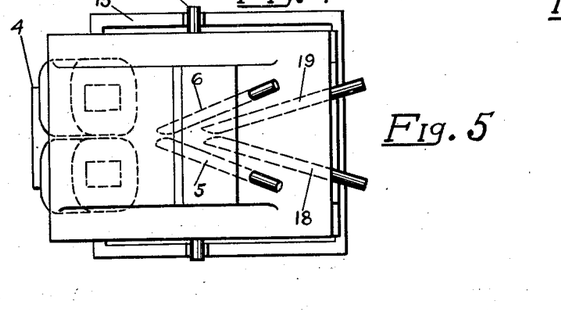
Figure 5 being a plan view of the same.
Figure 6:
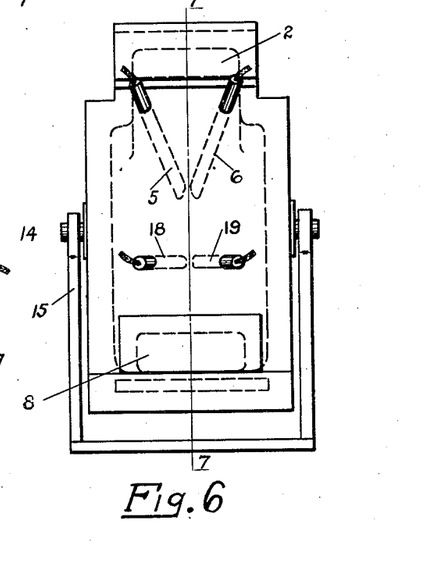
Figure 6 being a front view of Fig. 4.
Figure 9:
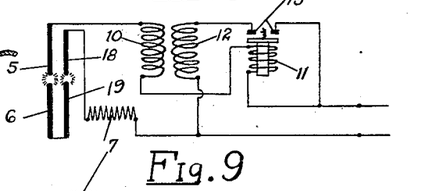

In certain forms of our furnace the shunt electromagnet winding 12 and the relay 11 may be dispensed with by providing a tilting means for the furnace. Such an arrangement as this is shown in Fig. 4 in which the body 1 is carried on journals 14 supported by any suitable manner such as end brackets 15 which form part of the framework carrying the furnace. It is to be understood, of course, that a combination of the magnet holding means and tilting arrangement, as shown for example in Fig. 4, may be used. In the form shown in Figs. 4 to 7 inc. the back wall of the furnace is inclined at an angle at the portion carrying the electromagnet 4. The object of inclining the wall at this point is to provide some friction for the work, whereby the friction serves to vary the flow of the rivets or work. In this particular form of furnace a cover 16 is shown closing the opening 2 and a cover 17 is shown closing the opening 8. Also four electrodes are illustrated for heating the furnace, an extra pair 18 and 19 being used as illustrated diagrammatically in Fig. 9. Otherwise this furnace functions in a similar manner to that illustrated in Figs. 1 to 3, inc.

Figure 10:
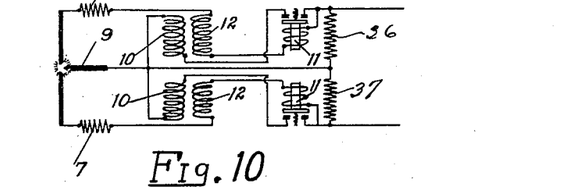
Figure 10 is a circuit diagram of the arrangement shown in Fig. 3.

In Fig. 10 which is the circuit diagram for a furnace shown in Fig. 3, two relays 11 are utilized and the electromagnet 4 carries four windings, or the magnet is one that will operate on two phase current, or two magnets, one in each phase; or one in each phase of a three phase to two phase arrangement. As shown in Fig. 10, the electrode 9 is connected to the junction of the balancing resistances 36 and 37.

Figure 11:
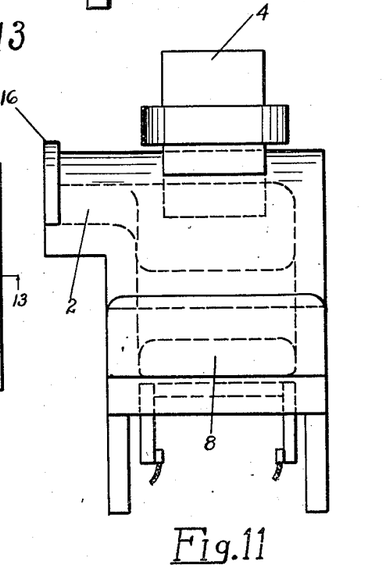
Figure 11 is a side view of a modified form of our invention.
Figure 12:
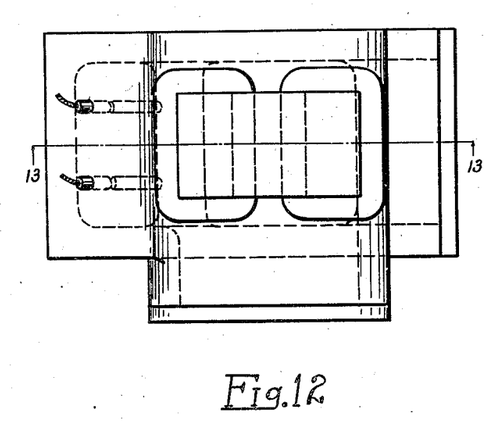
Figure 12 being a plan view of Figure 11.
Figure 13:
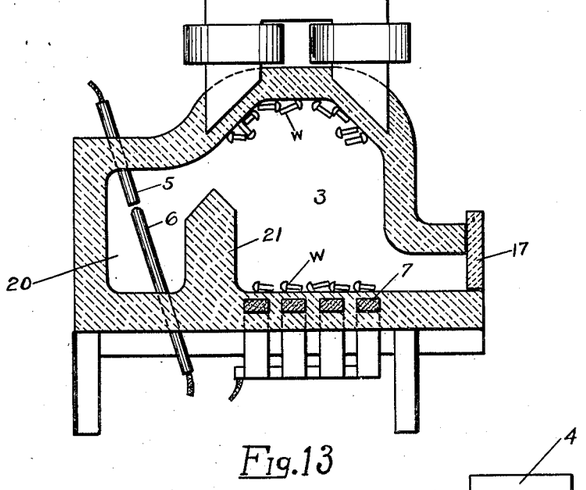
Figure 13 is a section on the line 13—13 of Fig. 12.

In Fig. 13 we have illustrated a modified form of our invention, in which the arc or heating chamber which we have designated 20 is separated from the work chamber 3 by means of a baffle wall 21. The wall 21 serving to throw the heat upward against the work. The electromagnet 4 has a somewhat different form as illustrated. A circuit arrangement for the type of furnace shown in Figs. 11 to 13, inc. may be that illustrated in Fig. 8.

Figure 14:
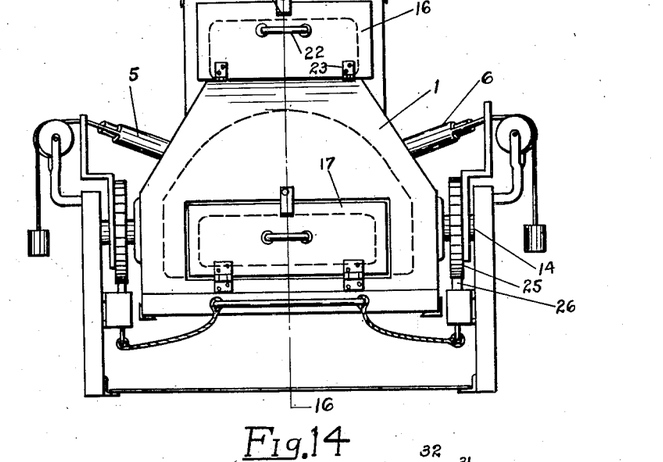
Figure 14 is an end view of another form of our invention showing more details than that illustrated in the previous forms.

In Fig. 14 we have illustrated an end view of a further modified form of the furnace embodying our invention, more details being shown in this form than in the others previously described; for example, the covering 16 for the opening 2 is shown in the form of a door having a handle 22, hinges 23 and a catch 24 for holding the door 16 in position. Also the cover 17 has hinges and a catch similar to the door 16. The furnace in this form is supported on journals 14, the same as the furnace shown in Fig. 4, but a ratchet wheel 25 and a catch 26 is provided to hold the furnace in any desired tilted position. It is to be understood, of course, that similar devices may be used on the furnaces previously described to hold them in any desired position, whereby the time of the falling of the work away from the electromagnet may be controlled. It may also be mentioned at this point that the flow of the rivets or work may be further controlled by adjusting the strength of the electromagnet 4 in any well known manner.

Figure 15:
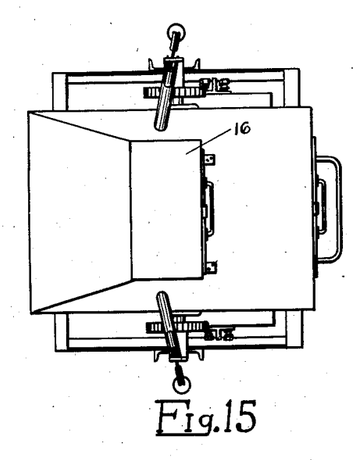
Figure 15 is a plan view of Fig. 14.
Figure 16:
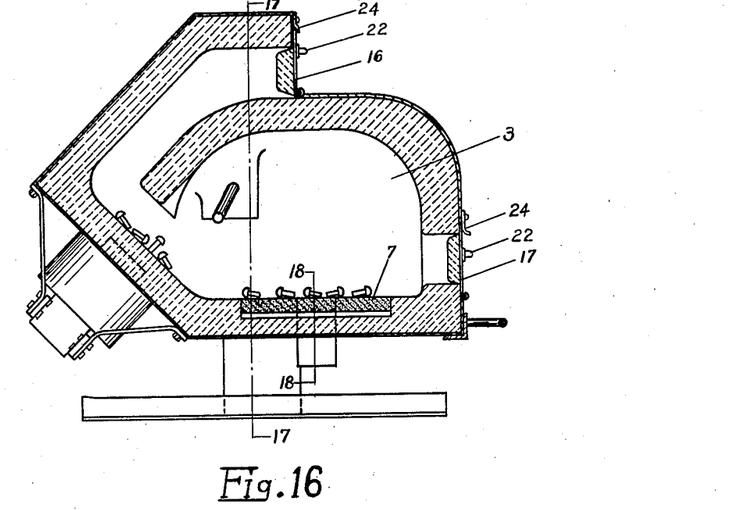
Figure 19:
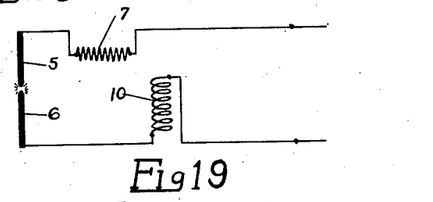
Figure 19 is a circuit diagram of the furnace shown in Figs. 14 to 18, inc.
Figure 20:
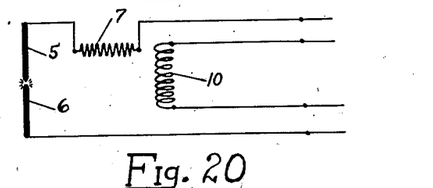
Figure 20 is a circuit diagram for the same furnace but using a separate source of current for the holding coil.
Figure 21:
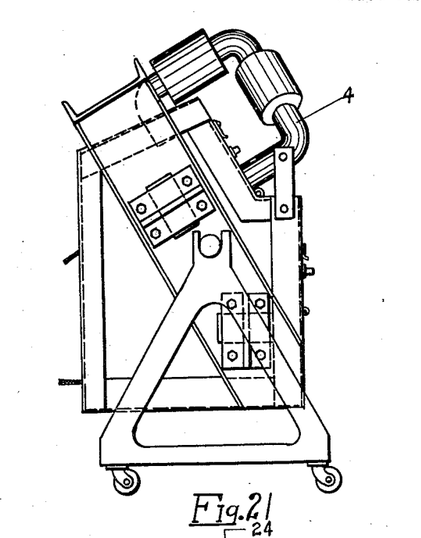
Figure 22:
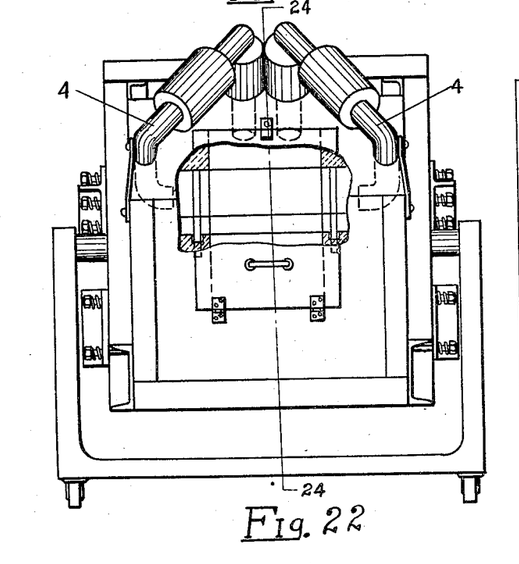
Figure 22 is a front view of Figure 21.
Figure 23:
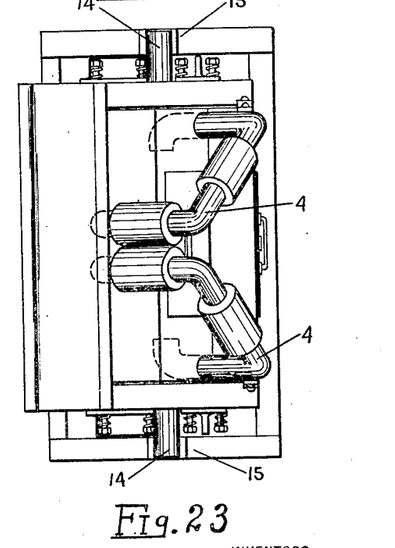
Figure 24:
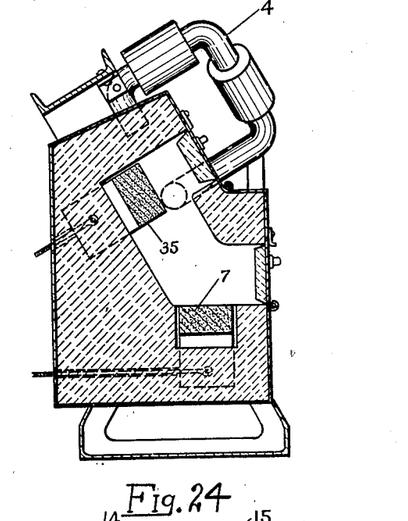
Figure 24 is a section on the line 24—24 of Fig. 22.

Figures 14, 15 and 16 also illustrate one means of supporting and feeding the electrodes 5 and 6, but it is to be understood that any suitable feeding means, either automatic or manual may be provided. In this form of furnace we have provided a somewhat different type of heating chamber and we have shown a larger passage too for loading the furnace with rivets. We have also shown the rivets directly on the auxiliary heater, after they have been dropped by the electromagnet. The circuit arrangement for this type of furnace is that illustrated in Fig. 19 in which the holding coil is represented by 10 and the stabilizing resistor by 7. The holding coil 10 may be energized by some other source of current than that supplying the electrodes 5 and 6 and when so energized, the circuit arrangement of Fig. 20 is used.

In the discussion of these furnaces it may be remarked that the usual source of current supply is alternating in character, and in the furnaces which we have constructed and tested, we have utilized alternating current for heating purposes. We have also used both alternating and direct current on the holding coil, in which case we have utilized an arrangement similar to that shown in Fig. 20.

Figure 17:
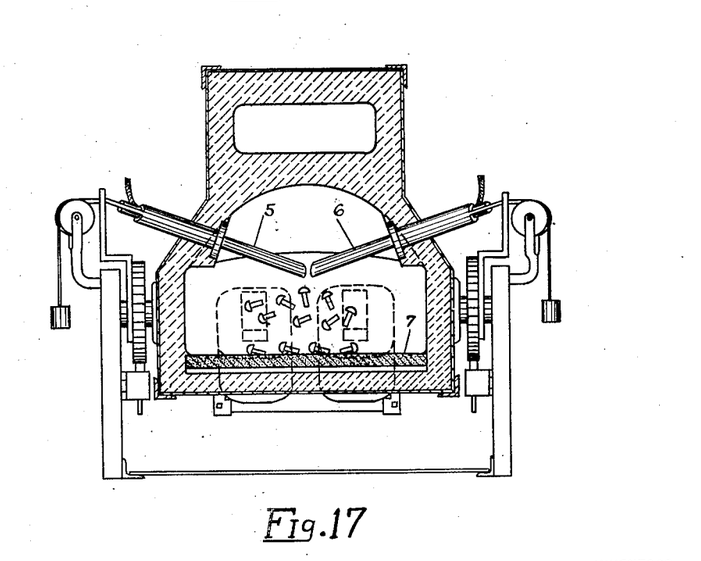
Figure 17 is a view on the line 17—17 of 16.
Figure 18:
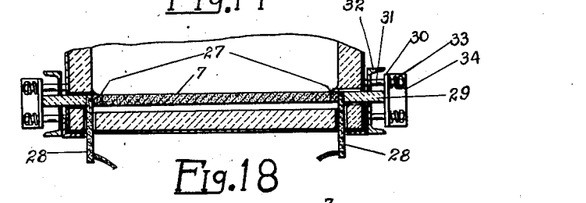
Figure 18 is a fragmentary sectional view on the line 18—18 of Fig. 16, showing the manner of holding and making connections to one of the heating units in the furnace.

Special reference may be made at this point to the stabilizing resistor 7 as illustrated particularly in Figs. 16, 17 and 18. As illustrated in these figures it is shown as a plate to which contact is made at the ends through the medium of blocks 27 and connectors 28, both preferably of graphite. Blocks 29, preferably of non-conducting material such as firebrick, are pressed against the connectors 28 by means of clamps 30 carried on bolts 31 fastened to the channel ends 32 constituting a part of the framework of the furnace. Resilient members, such as springs 33, are utilized back of the clamping nuts 34. These resilient members 33 are utilized to take up the expansion and contraction of the plate 7, blocks 27, connectors 28 and blocks 29, whereby a satisfactory electrical contact is always maintained between the connectors 28, blocks 27 and resistor plate 7. The material constituting plate 7 and the method of making the same will not be described herein, as it forms no part of our present invention, but will be made the subject of another application.

In the form of furnace shown in Figs. 21 to 24, inc., we have substituted in place of the arc electrodes 5 and 6 a heating device 35, which is similar to the stabilizing resistor 7; holding the rivets on the plate 35 by means of the electromagnet 4, which in these four views 21 to 24, inc., is of a somewhat different form than that previously described. In these latter forms we may use direct current of suitable voltage on the magnet. It will be noted in this latter form that the furnace can be tilted for the purpose of rolling the work back onto the plate 35, in case it is desired or in case the electromagnet 4 is dispensed with. In this type of furnace it will be seen that the heat derived from the resistor plate 7 will rise to the top plate of the furnace and assist the plate 35 in heating the rivets.

Figure 25:
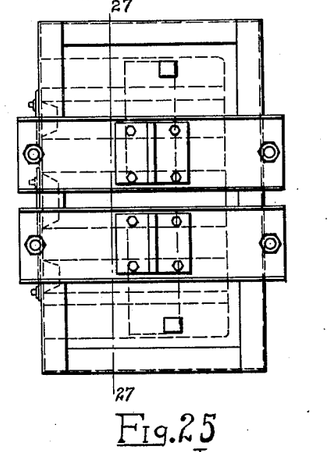
Figure 25 is an end view of another modified form of our invention.
Figure 26:
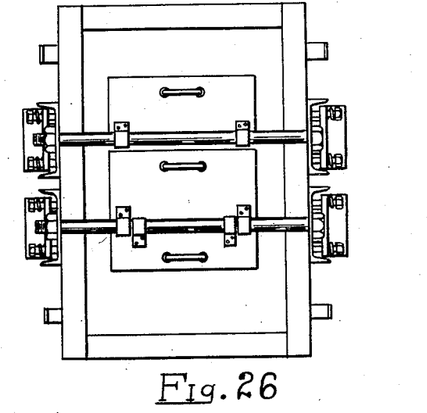
Figure 26 being the front view of Fig. 25.
Figure 27:
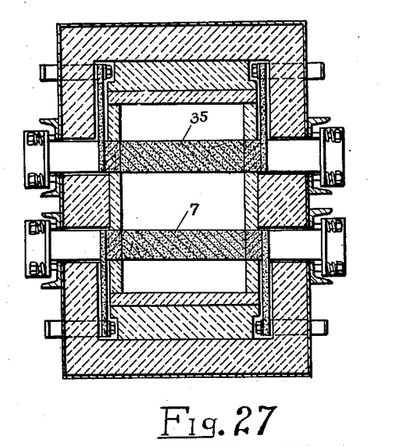
Figure 27 is a section on the line 27—27 of Fig. 25.
Figure 28:
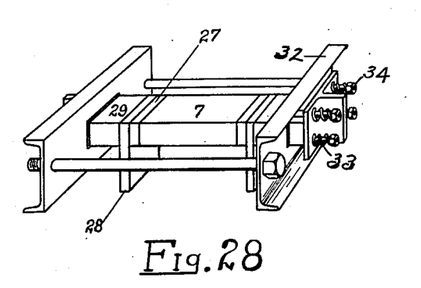
Figure 28 illustrates the manner of holding and carrying the current to the heating units as shown in Fig. 27.
Figure 29:
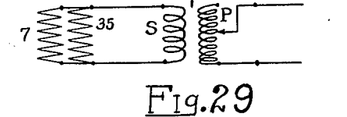
Figures 29 to 32, inclusive, illustrate wiring diagrams which may be used with the furnace shown in Figs. 25 to 28, inc.
Figure 30:
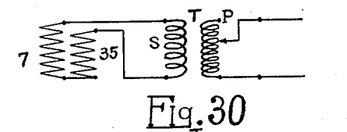
Figure 31:
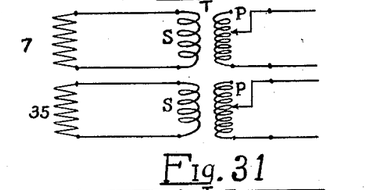
Figure 32:
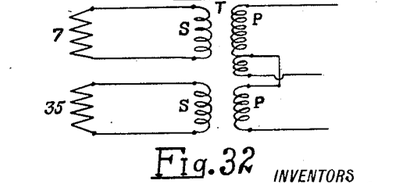

In the form shown in Figs. 25 to 27, inc., the furnace is made substantially rectangular in shape and rivets are heated on both the heating units 7 and 35, the heat from 7 serving to assist in heating the rivets on plate 35. After the rivets are heated they may be manually moved from the plate 35 to the plate 7, which is at a somewhat lower heat, or the furnace may be tilted as in the other forms described, causing the work on the top plate to pass to the bottom one and when the furnace is tilted back to normal position the work will be spread out on the bottom plate. The method of making connection to the plates 7 and 35 is illustrated in Fig. 27 and more in detail in Fig. 28 and is very similar to the method already described in connection with Fig. 18. It will be observed that this method of clamping and making connections with the special heating units 7 and 35 permits these heating units to be easily and quickly replaced when desired. The electrical circuits may be either one of the four forms shown in Figs. 29 to 32. In Fig. 29 a transformer T is illustrated having a primary P in which the number of turns are adjustable and a secondary S connected to the resistors 7 and 35, which are shown as being connected in multiple. Fig. 30 is the same as Fig. 29 except the resistors 7 and 35 are connected in series, while in Fig. 31, the transformer T is shown of a two phase type, one phase being connected to the resistor 7 and the other to resistor 35; while Fig. 32 shows a transformer having a three-phase primary supply with a two phase secondary, one phase being connected to resistor 7 and the other to resistor 35. The arrangement of Figs. 25 to 27, inc., gives hot rivets before the furnace is heated up. That is to say, the plate 7 and 35 are the first to heat and since the rivets are placed directly on the plates, they begin to heat at once; while in other types of furnaces the furnace itself must be heated up more or less before the rivets begin to take up heat.

It will be observed that in the forms of furnaces herein described in which an electric arc, or when an electric arc is not used, gas or liquid fuel is used in place thereof, that the cold rivets or work are held in the direct path of the heat rays by means of the magnetic field. In some cases it may be advisable to supply the main heat to the furnace with gas or oil and keep the bottom hot by electric current which may be thermostatically controlled.

Furthermore that the furnace wall is arched so as to focus heat rays onto the work. Also when the rivets reach a proper heat and before burning occurs, they automatically drop beneath or behind the region of the arc or direct source of heat, to a point where the heat is reflected or caused by convection currents, thereby providing automatic protection against the burning of the rivets or work.

It will be further observed that cold rivets are fed from above and progress through the various stages of heating to a finished heat and are then automatically conveyed to a convenient place near the exit door, which is beneath the feed door. Also it will be seen that a considerable quantity of rivets or pieces may be fed in at one time, so that the number of times the feed door is opened is reduced to a minimum. In other words, the feed passage may be, as a matter of fact, actually filled full of rivets and as they are heated up they are automatically released and other rivets or work falls down in the region of the magnetic field to take their place. It will be observed that the rivets back in the feed passage are preheated to a considerable extent before they get down to the real hot region, consequently the heat in the feed passage is not wasted.

Besides the advantage of being able to heat a large quantity of rivets of any or different sizes and to have this supply always on hand, it will be seen that the rivets must be substantially heated uniformly throughout before they are released by the magnetic field, and the further advantage of our furnace is that it is very high in electrical and thermal efficiency and we have found that the radiated heat from the furnace is not a discomfort to the operator as in other types of furnaces.

Figure 1:
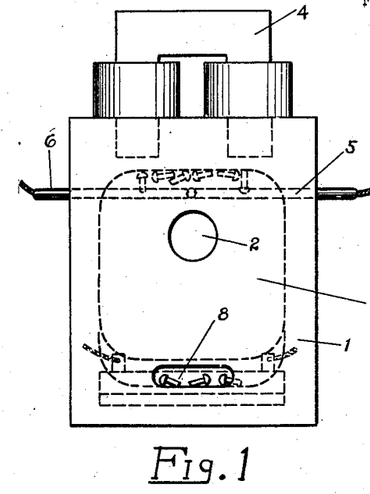
Figure 1 illustrates an end view of one form of our furnace.
Figure 7:
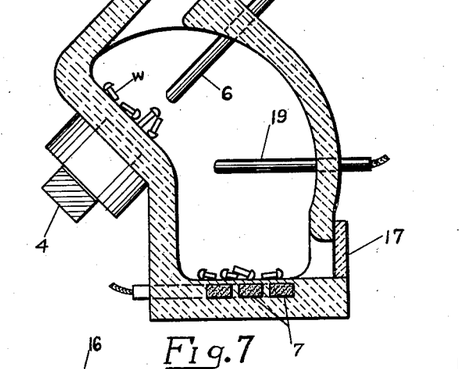
Figure 7 a view on the line 7—7 of Fig. 6.

In certain of the figures, for instance Figs. 1 and 2, the resistor 7 is in the form of a single plate, but the resistor 7 may be made up of a number of strips, the same as shown in Figs. 7 and 13, in which figures, as well as in Figs. 1 and 2, the resistor 7 is placed slightly below the surface of the bottom of the chamber 3, so that the work does not make direct electrical contact with the plate or plate sections, which sections may be connected in series or parallel or a combination of the two if desired. When the resistor 7 is substantially flush with the bottom of the chamber 3 as illustrated in Fig. 16, or when the resistors 7 and 35 are disposed as in Figs. 24 and 27, then we have found that there is some danger of the electric current leaving the resistor and passing through the rivets themselves in multiple paths with portions of the resistor plate, tending to burn the rivets or work pieces in spots, or even to fuse the pieces of work together. In order to overcome this difficulty we have utilized a very thin layer of substantially non-electrical conducting material on the surface of the resistor 7. For the purpose of clarity, we have made no attempt to show this electrical non-conducting material on the resistor 7 in the figures mentioned. We have also overcome this difficulty by use of a material which is somewhat soft, whereby the work pieces will imbed themselves slightly in the material, thereby increasing the heating contact and holding the work pieces in position so that they are not apt to become shifted around and make contact with each other, thereby forming a parallel circuit with a section of the resistor plate, but, as has been pointed out, the material constituting the resistor will not be further described herein.

As explained, the drawings are more or less diagrammatic in form and it will, therefore, be understood to one skilled in this art that various changes may be made in the detail construction of the different forms of our invention without departing from the spirit of the same or the scope of the appended claims.

Having thus described our invention, what we claim is:

1. In a heating furnace including a chamber for the reception of work, means for heating the chamber and said work to a critical temperature, with further means for retaining the work in a designated portion of the chamber until it has been heated to said critical temperature whereby the work releases itself and then moves automatically to another part of the furnace; said means for retaining the work comprising an electromagnet having all its parts located wholly outside of the chamber and out of direct contact with the work.

2. In a heating furnace including a chamber for the reception of work, means for heating the chamber and said work to a critical temperature, with further means for retaining the work in a designated portion of the chamber until it has been heated to said critical temperature, whereby the work releases itself and then moves automatically to another part of the furnace; said retaining means for the work comprising an electromagnet so positioned that all its parts are self-cooling; and means for varying the predetermined critical heating temperature.

3. In a heating furnace, a chamber having a designated portion for the reception of work to be heated, means for producing heat within the chamber and directing the same toward the work, means for holding the work within said designated portion until a critical temperature of the work is reached, whereby the work is automatically released and passed to another part of said furnace out of the direct rays of said source of heat, and auxiliary means for supplying heat to the work at said other part of the furnace for the purpose described.

4. In a heating furnace, a chamber for the reception of work to be heated, electromagnetic means for retaining the work in a designated portion of the chamber until it has been heated to a predetermined temperature at which point it is automatically released and passes to another part of the furnace, means for varying this predetermined temperature, means for producing heat and directing it onto the work and an auxiliary source of heat in said other part of the furnace for maintaining the work in a heated state.

5. In a heating furnace, a chamber having a designated portion for the reception of work to be heated, means for holding the work in said designated portion until a predetermined temperature is reached, and then releasing the work, means for heating said work and chamber, and means for tilting the furnace, whereby any work within the chamber may be moved to said designated portion for heating.

6. In a heating furnace having a chamber with openings therein for feeding in and withdrawing work therefrom, said chamber having a designated portion at which the work is to be heated, means for supplying heat to said chamber and directing it towards said work, an electromagnet for automatically holding said work within said designated portion until a predetermined temperature is reached and then passing it to said withdrawal opening of the furnace, and an auxiliary source of heat for maintaining said work at substantially said predetermined temperature.

7. In a heating furnace, a chamber having a designated portion for the reception of work to be heated, an electromagnet for holding the work in said designated portion until a predetermined temperature is reached, and then releasing the work, said portion being so positioned with respect to the bottom of said furnace that when the work is released it will automatically pass to the bottom of said furnace, arc electrodes for heating said work and chamber, and means for tilting the furnace, whereby any work on the bottom thereof may be moved to said designated portion as and for the purpose described.

8. In a heating furnace, a chamber having a work feed opening and a withdrawal opening and a portion intermediate said openings for retaining the work while it is being heated, means for supplying heat and directing it toward said chamber portion and means for retaining the work within said portion until a predetermined temperature of the work is reached whereby it is then automatically passed to that part of the furnace near said withdrawal opening, said feed opening being pointed toward said intermediate portion so as to feed the work automatically to said chamber portion as said work is heated and released therefrom, and an auxiliary heating device adjacent said withdrawal opening for the purpose described.

9. In a heating furnace, a chamber having a designated portion for the reception of work to be heated, an electromagnet located wholly outside the furnace for holding the work in said designated portion until a predetermined temperature is reached and then releasing the work, and an electric arc, having its current passing through said electromagnet, for heating said work and chamber.

10. In a heating furnace, a chamber having a designated portion for the reception of work to be heated, an electromagnet for holding the work in said designated portion until a predetermined temperature is reached and then releasing the work, an electric arc having its current passing through said electromagnet for heating said work and chamber, and additional electromagnetic means for holding the work in said furnace portion should said arc go out.

11. In a heating furnace, a work heating chamber, arc electrodes extending within said chamber, a resistor connected in series with said arc electrodes, and an electromagnet having a winding in series with said arc electrodes for holding the work in a position to be heated until a predetermined temperature of the work is reached.

12. In a heating furnace, a work heating chamber, arc electrodes extending within said chamber, a resistor carried in the bottom of said furnace and connected in series with said arc electrodes, an electromagnet so positioned on the furnace as to attract said work as it is fed into the furnace and hold the same until a predetermined temperature of the work is reached, when said work will fall automatically over said resistor for the purpose described.

13. In a heating furnace, a chamber having arc electrodes for heating work to a predetermined temperature, electromagnetic means for holding the work in a given portion of the furnace until said temperature is reached and then releasing the same, and a resistor in another portion of the furnace for maintaining the work at near the releasing temperature.

14. In a heating furnace, a chamber having means for heating work, introduced therein, to a predetermined temperature, means for holding the work in a given portion of the furnace until said temperature is reached; then releasing the same and passing it to the bottom of the chamber, a resistor situated in the bottom of said chamber, and means associated with the resistor for preventing the work pieces from forming a definite electrical shunt path with any substantial portion of said resistor.

15. In a heating furnace, a chamber having a portion formed and positioned for the reception of work pieces, means for holding the work in said portion of the furnace until a predetermined temperature is reached; then releasing the work pieces, whereby they fall to the bottom of the furnace, means for heating said work pieces when so held, a resistor constituting a part of the bottom of the furnace, means for heating the resistor to maintain the work pieces hot, and means for preventing the work pieces from forming any substantial electrical shunt to a part of the resistor.

16. In a heating furnace, a chamber having a portion formed and positioned for the reception of work pieces, electromagnetic means for holding the work in said portion of the furnace until a predetermined temperature is reached, then releasing the work pieces, whereby they fall to the bottom of the furnace, arc electrodes for heating the work pieces when so held, a resistor in series with said electrodes and forming a part of the bottom of the furnace, with means associated with the resistor for preventing the work pieces as they fall to the bottom of the furnace from forming any substantial electrical shunt circuit to a portion of the resistor.

17. In a heating furnace, a chamber having means for heating work to a predetermined automatically releasing temperature in one portion with means external of the furnace for holding the work in said portion until such predetermined temperature is reached, and a second portion equipped with means for holding the work at substantially said temperature.

18. In a heating furnace, a chamber having means for heating work to a predetermined automatically releasing temperature in one portion with means external of the furnace for holding the work in said portion until such predetermined temperature is reached, and a second portion equipped with means for holding the work at substantially said temperature, said second mentioned means serving also to heat the chamber and preheat the work as described.

19. In a heating furnace, a work heating chamber having arc electrodes therein, a resistor located in the bottom of the chamber and connected in series with said arc electrodes, an electromagnet having a winding in series with said arc electrodes for the purpose described and quick detachable yielding means for holding said resistor in position in the furnace.

20. In a heating furnace, a chamber having arc electrodes therein, a supplemental heating device therein connected in series with said arc electrodes, and quickly detachable yielding means for holding said heating device in place in said chamber.

21. In a heating furnace, a work heating chamber having arc electrodes therein, a resistor located in the bottom of the chamber and connected in series with said arc electrodes, and an electromagnet having a winding in series with said arc electrodes for the purpose described.

In testimony whereof, we have hereunto put our signatures, this 16th day of January, 1922.

THOMAS M. HUNTER.
CLAUDE J. HOLSLAG.